United States Patent
Yi et al.

(10) Patent No.: US 10,244,514 B2
(45) Date of Patent: Mar. 26, 2019

(54) METHOD AND APPARATUS FOR SPLITTING PUSCH/PUCCH WITH LARGE NUMBER OF AGGREGATED CARRIERS IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/329,861

(22) PCT Filed: Sep. 10, 2015

(86) PCT No.: PCT/KR2015/009534
§ 371 (c)(1),
(2) Date: Jan. 27, 2017

(87) PCT Pub. No.: WO2016/039572
PCT Pub. Date: Mar. 17, 2016

(65) Prior Publication Data
US 2017/0273070 A1    Sep. 21, 2017

Related U.S. Application Data

(60) Provisional application No. 62/049,349, filed on Sep. 11, 2014.

(51) Int. Cl.
*H04W 72/04* (2009.01)
*H04L 1/18* (2006.01)
(Continued)

(52) U.S. Cl.
CPC ........... *H04W 72/0413* (2013.01); *H04L 1/18* (2013.01); *H04L 1/1812* (2013.01); *H04L 5/001* (2013.01);
(Continued)

(58) Field of Classification Search
CPC ......... H04L 5/001; H04L 5/0055; H04L 5/00; H04L 5/1469; H04L 1/1861;
(Continued)

(56) References Cited

U.S. PATENT DOCUMENTS

2011/0243066 A1* 10/2011 Nayeb Nazar .......... H04L 1/007
370/328
2012/0230268 A1   9/2012 Marinier et al.
(Continued)

OTHER PUBLICATIONS

"3GPP TS 36.300 V12.1.0 (Mar. 2014): 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Organizational Partners, 2014, Section 5.5, 4 pages.
(Continued)

*Primary Examiner* — Jung Liu
(74) *Attorney, Agent, or Firm* — Birch, Stewart, Kolasch & Birch, LLP

(57) ABSTRACT

A method and apparatus for transmitting uplink control information (UCI) in a wireless communication system is provided. When a large number of carries are configured, a user equipment (UE) splits the UCI for a plurality of cells into a physical uplink control channel (PUCCH) and a physical uplink shared channel (PUSCH), and transmits the split UCI via the PUCCH and the PUSCH.

9 Claims, 5 Drawing Sheets

(51) Int. Cl.
*H04L 5/00* (2006.01)
*H04W 88/02* (2009.01)

(52) U.S. Cl.
CPC .......... *H04L 5/0055* (2013.01); *H04L 5/0057* (2013.01); *H04L 5/0064* (2013.01); *H04W 88/02* (2013.01)

(58) Field of Classification Search
CPC ....... H04L 5/0094; H04L 1/1671; H04L 5/14; H04L 1/0057; H04L 1/001; H04L 5/0016; H04L 1/1822; H04L 2001/125; H04L 5/0053; H04L 5/0048; H04L 1/007; H04L 1/0073; H04L 5/005; H04L 27/2601; H04L 5/0037; H04L 5/0051; H04W 74/006; H04W 74/08; H04W 36/0072; H04W 16/26; H04W 72/0446; H04W 72/0406; H04W 72/0413; H04W 48/16; H04W 72/00; H04W 52/325; H04W 74/0833; H04W 52/146; H04W 52/16; H04W 52/32; H04W 4/00; H04W 56/0005; H04W 56/0045; H04W 52/367; H04B 7/2643; H04B 7/265; H04B 1/7097; H04B 2201/7097; H04B 2201/698; H04B 17/318
See application file for complete search history.

(56) References Cited

U.S. PATENT DOCUMENTS

| | | | | |
|---|---|---|---|---|
| 2014/0056271 | A1* | 2/2014 | Ahn | H04W 52/146 370/329 |
| 2014/0269452 | A1* | 9/2014 | Papasakellariou | H04B 7/2643 370/280 |
| 2014/0269454 | A1* | 9/2014 | Papasakellariou | H04W 52/34 370/280 |
| 2015/0208402 | A1* | 7/2015 | Hwang | H04W 72/0413 370/329 |
| 2015/0215930 | A1* | 7/2015 | Kim | H04W 52/0212 370/329 |
| 2015/0327243 | A1* | 11/2015 | Yin | H04W 52/281 370/329 |
| 2015/0358924 | A1* | 12/2015 | Papasakellariou | H04W 52/346 370/329 |
| 2016/0044606 | A1* | 2/2016 | Yin | H04W 52/325 455/450 |
| 2016/0065345 | A1* | 3/2016 | Kim | H04W 72/0406 370/330 |

OTHER PUBLICATIONS

"3GPP TS 36.300 V12.1.0 (Mar. 2014): 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP Organizational Partners, 2014, Section 7.5, 4 pages.

Ericsson, "Support of PUCCH on SCell", R1-143307, 3GPP TSG RAN WG1 Meeting #78, Dresden, Germany, Aug. 2014, 5 pages.

Huawei, Hisilicon, "Details of reusing dual connectivity for PUCCH on SCell with CA", R1-142834, 3GPP TSG RAN WG1 Meeting #78, Dresden, Germany, Aug. 2014, 10 pages.

Qualcomm Incorporated, "Remaining details for PUCCH on SCell", R1-142953, 3GPP TSG RAN WG1 Meeting #78, Dresden, Germany, Aug. 2014, 7 pages.

Samsung, "Correction to UCI embedding in case of a single serving cell and simultaneous PUSCH and PUCCH transmission", R1-143643, 3GPP TSG RAN WG1 Meeting #78, Dresden, Germany, Aug. 2014, 5 pages.

Fujitsu, "Power Allocation Strategy for Power Limited UEs in Dual-connectivity," 3GPP TSG RAN WG1 Meeting #76bis, R1-141227, Shenzhen, China, Mar. 31-Apr. 4, 2014 (Mar. 30, 2014), pp. 1/3 to 6/3, XP050786902.

* cited by examiner

[Fig. 1]
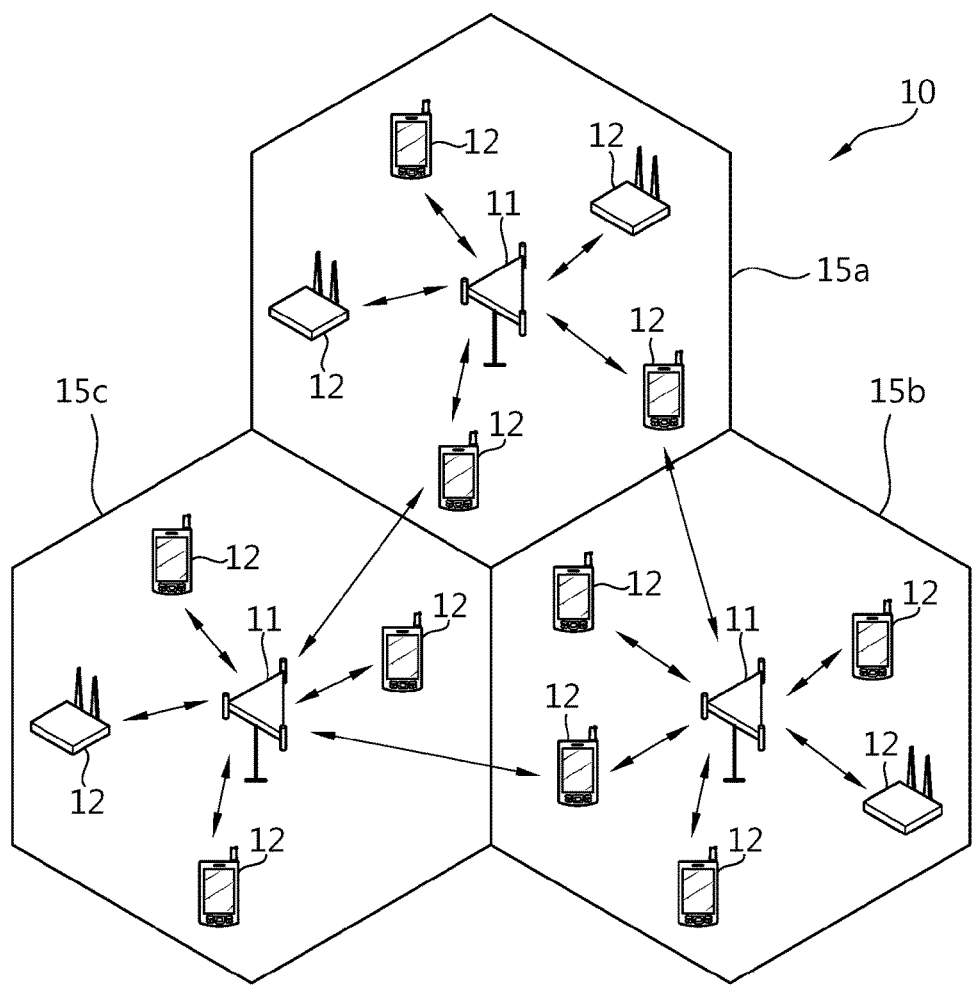
[Fig. 2]
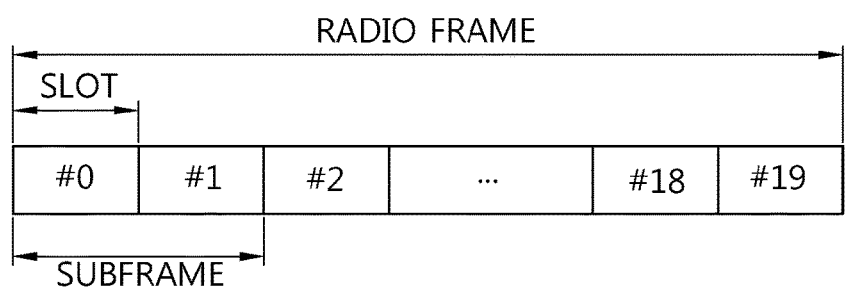

[Fig. 3]
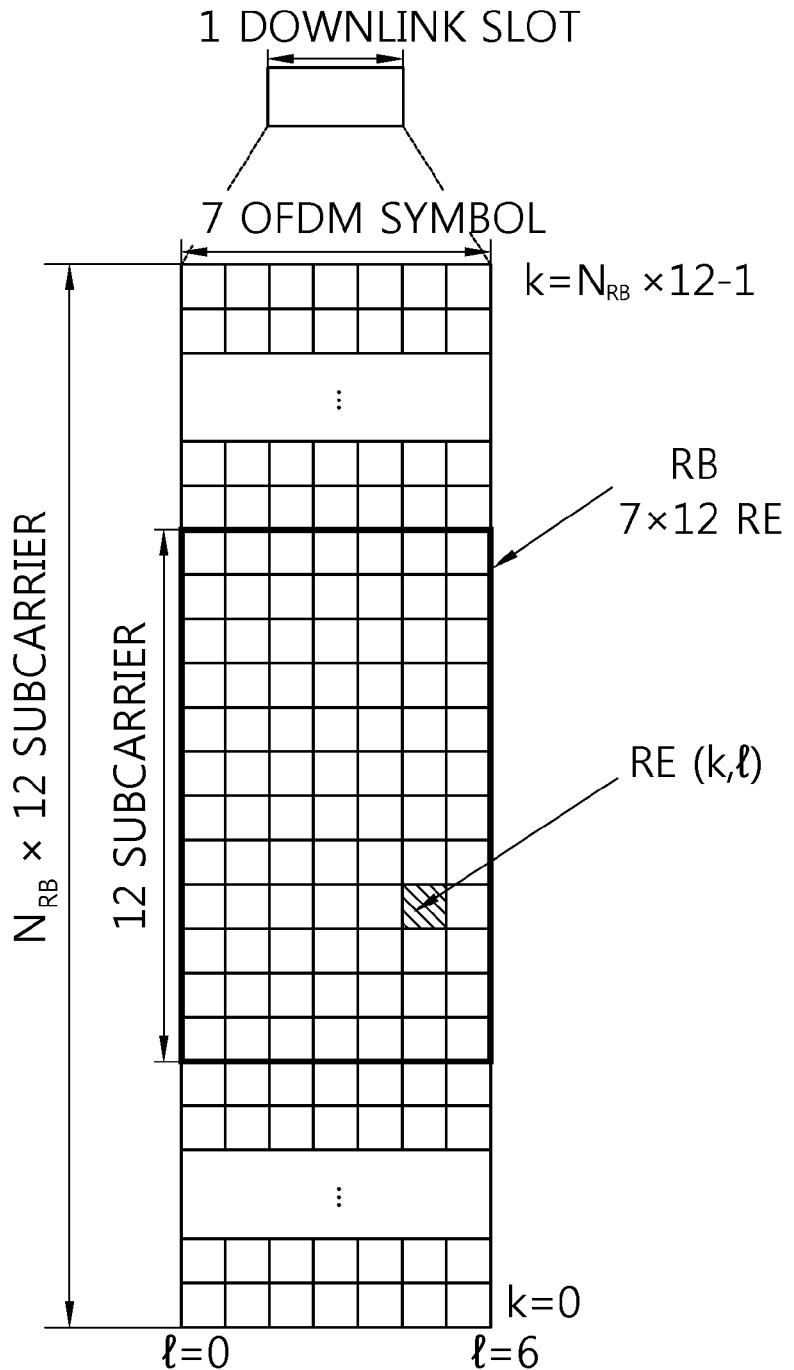

[Fig. 4]
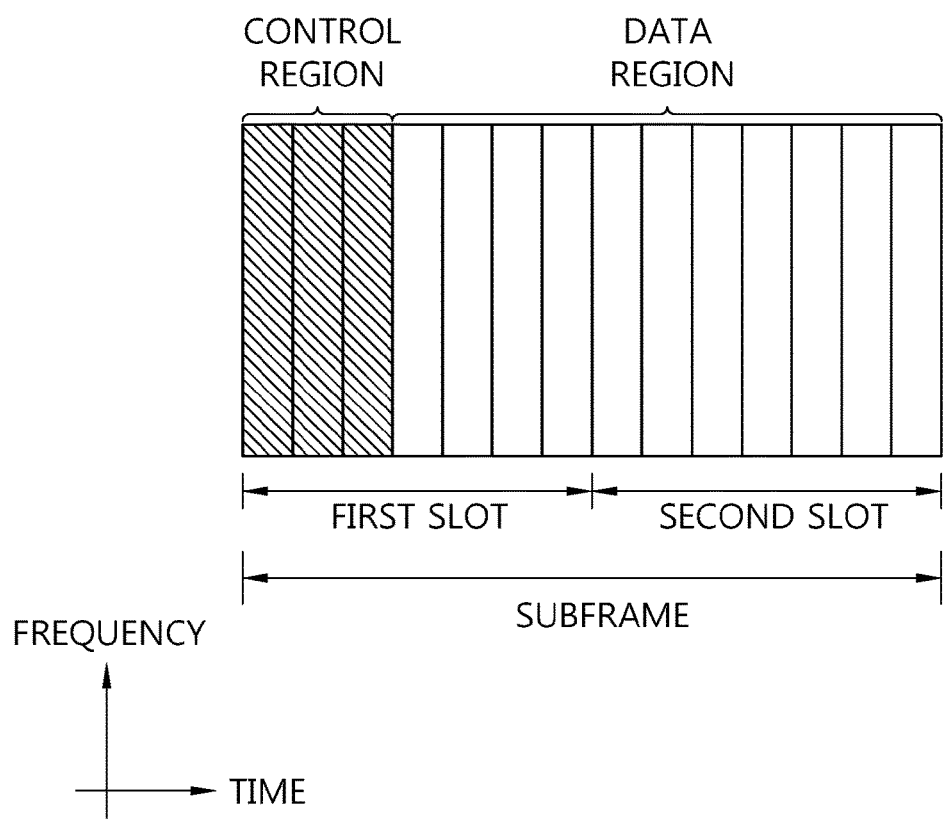

[Fig. 5]
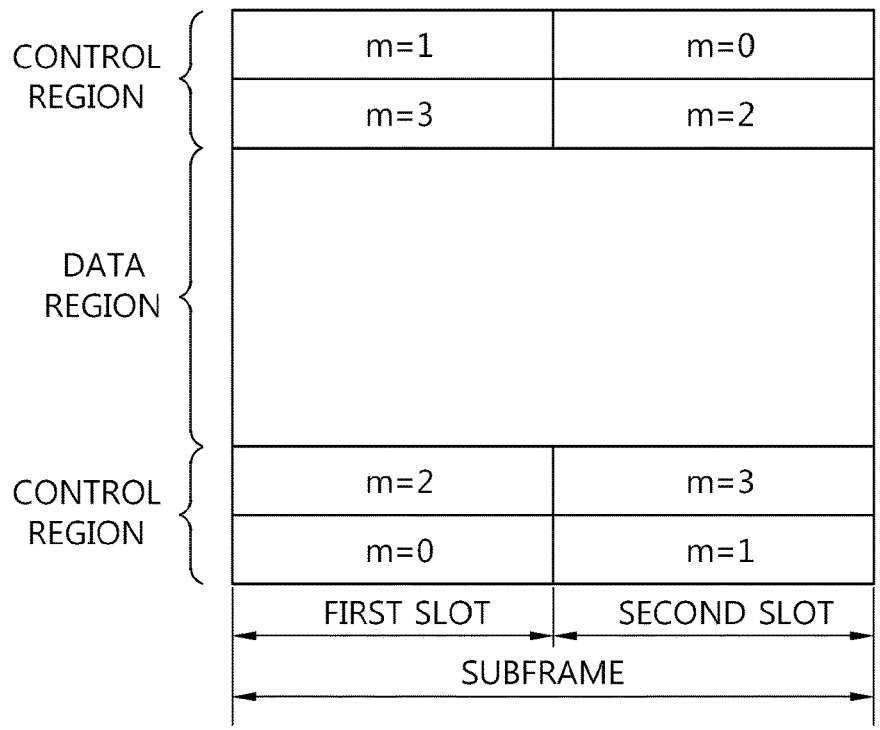
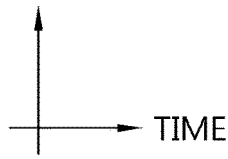
[Fig. 6]
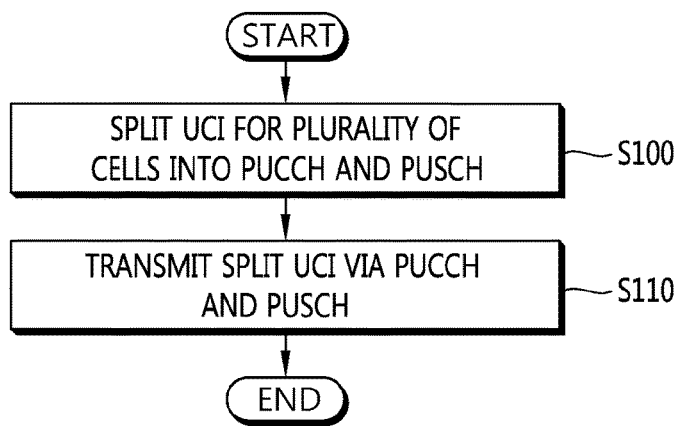

[Fig. 7]
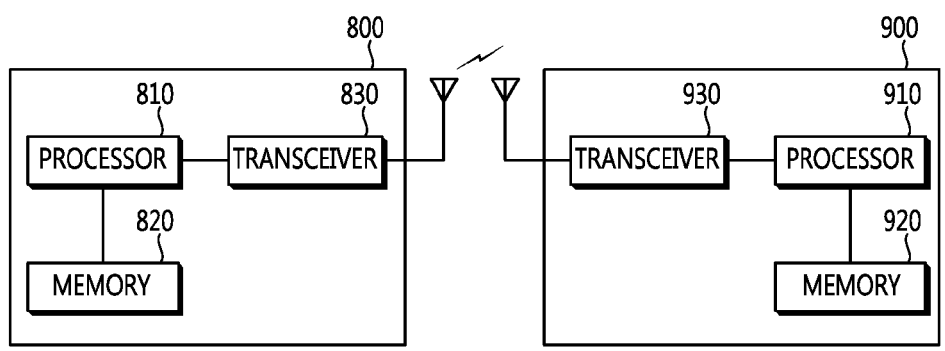

METHOD AND APPARATUS FOR SPLITTING PUSCH/PUCCH WITH LARGE NUMBER OF AGGREGATED CARRIERS IN WIRELESS COMMUNICATION SYSTEM

CROSS REFERENCE TO RELATED APPLICATIONS

This application is the National Phase of PCT International Application No. PCT/KR2015/009534, filed on Sep. 10, 2015, which claims priority under 35 U.S.C. 119(e) to U.S. Provisional Application No. 62/049,349, filed on Sep. 11, 2014, all of which are hereby expressly incorporated by reference into the present application.

TECHNICAL FIELD

The present invention relates to wireless communications, and more particularly, to a method and apparatus for splitting a physical uplink shared channel (PUSCH) and a physical uplink control channel (PUCCH) for hybrid automatic repeat request (HARQ) acknowledgement (ACK) with a large number of aggregated carriers in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE may configure carrier aggregation (CA). In CA, two or more component carriers (CCs) are aggregated in order to support wider transmission bandwidths up to 100 MHz. A user equipment (UE) may simultaneously receive or transmit on one or multiple CCs depending on its capabilities.

When a UE is configured with a large number of carriers such as 16, the size of uplink control information (UCI) may also increase. Based on the current design of physical uplink control channel (PUCCH) (such as via PUCCH format 3), the number of UCI bits carried in a PUCCH is limited. Thus, when a network configures multiple carriers, a method for supporting the UCI with a large number of bits may be necessary. One example is to design a new PUCCH format which can include more UCI bits than the current PUCCH format. However, mechanisms to reuse the currently available PUCCH formats may also be considered.

DISCLOSURE OF INVENTION

Technical Problem

The present invention provides a method and apparatus for splitting a physical uplink shared channel (PUSCH) and a physical uplink control channel (PUCCH) for hybrid automatic repeat request (HARQ) acknowledgement (ACK) with a large number of aggregated carriers in a wireless communication system. The present invention provides a mechanism to split HARQ-ACK feedbacks to handle a large number of aggregated carriers such as splitting via PUSCH and PUCCH.

Solution to Problem

In an aspect, a method for transmitting, by a user equipment (UE), uplink control information (UCI) in a wireless communication system is provided. The method includes splitting the UCI for a plurality of cells into a physical uplink control channel (PUCCH) and a physical uplink shared channel (PUSCH), and transmitting the split UCI via the PUCCH and the PUSCH.

In another aspect, a user equipment (UE) includes a memory, a transceiver, and a processor coupled to the memory and the transceiver, and configured to split uplink control information (UCI) for a plurality of cells into a physical uplink control channel (PUCCH) and a physical uplink shared channel (PUSCH), and control the transceiver to transmit the split UCI via the PUCCH and the PUSCH.

Advantageous Effects of Invention

UCI for a large number of aggregated carriers can be transmitted efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a method for splitting UCI according to an embodiment of the present invention.
FIG. 7 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number NAL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Carrier aggregation (CA) is described. It may be referred to Section 5.5 and 7.5 of 3GPP TS 36.300 V12.1.0 (2014-03). A UE with single timing advance (TA) capability for CA can simultaneously receive and/or transmit on multiple CCs corresponding to multiple serving cells sharing the same TA (multiple serving cells grouped in one timing advance group (TAG)). A UE with multiple TA capability for CA can simultaneously receive and/or transmit on multiple CCs corresponding to multiple serving cells with different TAs (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG). The CA is supported for both contiguous and non-contiguous CCs with each CC limited to a maximum of 110 resource blocks in the frequency domain.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. It is not possible to configure a UE with more UL CCs than DL CCs. In typical time division duplex (TDD) deployments, the number of CCs and the bandwidth of each CC in UL and DL is the same. The number of TAGs that can be configured depends on the TAG capability of the UE. CCs originating from the same eNB need not to provide the same coverage.

When CA is configured, the UE only has one RRC connection with the network. At RRC connection establishment/re-establishment/handover, one serving cell provides the NAS mobility information (e.g. tracking area identity (TAI)), and at RRC connection re-establishment/handover, one serving cell provides the security input. This cell is referred to as the primary cell (PCell). In the DL, the carrier corresponding to the PCell is the DL primary CC (DL PCC), while in the UL, it is the UL primary CC (UL PCC).

Depending on UE capabilities, secondary cells (SCells) can be configured to form, together with the PCell, a set of serving cells. In the DL, the carrier corresponding to a SCell is a DL secondary CC (DL SCC), while in the UL, it is an UL secondary CC (UL SCC).

Therefore, the configured set of serving cells for a UE always consists of one PCell and one or more SCells. For each SCell, the usage of UL resources by the UE in addition to the DL resources is configurable (the number of DL SCCs configured is therefore always larger than or equal to the number of UL SCCs and no SCell can be configured for usage of UL resources only). From a UE viewpoint, each UL resource only belongs to one serving cell. The number of serving cells that can be configured depends on the aggregation capability of the UE. PCell can only be changed with handover procedure (i.e. with security key change and RACH procedure). PCell is used for transmission of PUCCH. Unlike SCells, PCell cannot be de-activated. Re-establishment is triggered when PCell experiences radio link failure (RLF), not when SCells experience RLF. NAS information is taken from PCell.

Hereinafter, a method for splitting UCI, e.g. HARQ-ACK, CSI, etc., for a plurality of cells into PUCCH and/or PUSCH when a large number of carriers are configured is described according to an embodiment of the present invention. According to an embodiment of the present invention, mechanisms to reuse the currently available PUCCH formats and/or mechanisms to use PUSCH UCI piggybacking as much as possible is described. For example, if a UE supports simultaneous transmission of PUCCH/PUSCH, UCI such as HARQ-ACK or periodic CSI reports may be piggybacked via PUCCH and PUSCH simultaneously. Furthermore, instead of utilizing only one PUSCH, multiple PUSCHs may piggyback the HARQ-ACK and/or CSI feedbacks. Hereinafter, UCI may include HARQ-ACK and/or CSI, and further include other various types of UCI. For splitting UCI, e.g. HARQ-ACK, CSI, etc., the following mechanisms may be considered.

(1) HARQ-ACK may be piggybacked via PUCCH up to the maximum allowed bits, and if there is remaining HARQ-ACK, the remaining HARQ-ACK may be piggybacked via PUSCH. HARQ-ACK may be prioritized over CSI regardless of simultaneous transmission of HARQ-ACK/CSI. If splitting UCI between PUCCH and PUSCH is allowed, regardless of simultaneous transmission of HARQ-ACK/CSI, a UE may piggyback CSI via PUSCH. When the number of HARQ-ACK bits is less than the maximum allowed bits which can be carried via PUCCH format 3, and the UE may need to transmit CSI feedbacks as well, if simultaneous transmission of HARQ-ACK/CSI is configured. In this case, HARQ-ACK and one CSI report may be piggybacked via PUCCH if HARQ-ACK and one CSI report can be accommodated within a PUCCH. The remaining CSI may be piggybacked via PUSCH. If HARQ-ACK and one CSI cannot be accommodated within a PUCCH, CSI feedbacks may be piggybacked via PUSCH.

(2) The number of carriers whose UCI is transmitted via PUCCH may be limited. For example, up to 5 CCs may be assumed to utilize PUCCH to transmit UCI, as the same as the current mechanism. If a UE is configured with more than 5 CCs, UCI of those carriers may be transmitted via PUSCH. The following variations of this approach may be considered.

One variation is to limit a different number of CCs used by PUCCH (for example, 8), and disable transmitting CSI via PUCCH. That is, regardless whether HARQ-ACK is transmitted via PUCCH or PUSCH, if a UE is configured with more than 5 CCs (the number may be smaller if TDD is used for at least one configured carrier), CSI may be piggybacked via PUSCH. Regardless of the approach, to apply the proposed approach, a UE may be configured with a mode such as "PUCCH_PUSCH_UCI_SPLIT".

Another variation is to configure a set of CCs whose HARQ-ACKs are transmitted via PUCCH, whereas HARQ-ACKs of other CCs are transmitted via PUSCH. In this case, further alternatives may be considered depending the handling of CSI. The CSI of a CC may be handled as same as the configuration of HARQ-ACK (i.e. if HARQ-ACK is transmitted via PUCCH, CSI may also be transmitted via PUCCH). Or, CSI may be piggybacked via PUSCH regardless of configuration. If simultaneous transmission of PUCCH/PUSCH is not configured, all UCI may be piggybacked via PUSCH. However, if PUCCH_PUSCH_UCI_SPLIT is configured, periodic CSI feedbacks may not be dropped and all CSI feedbacks may be piggybacked via PUSCH. Alternatively, to support PUCCH_PUSCH_UCI_SPLIT, it may be mandated to support simultaneous transmission of PUCCH/PUSCH so that UCI may be split between PUCCH and PUSCH. For this approach, a UE may select CCs based on its SCellIndex (e.g. from the lowest). By this way, HARQ-ACK of PCell (SCellIndex=0) may be transmitted via PUCCH.

Another variation may occur when more than one PUCCH is transmitted (e.g. PUCCH offloading to SCell). In this case, configuration of CCs per each CC may be done independently and the remaining UCI may be piggybacked via PUSCH. In terms of PUSCH piggyback, all the remaining UCI may be piggybacked via PUSCH. To avoid potential confusion in terms of DL assignment index (DAI) or HARQ-ACK timing, it may also be considerable to separate PUSCH piggyback by carrier group where each carrier group has one PUCCH cell.

(3) UCI may not be transmitted via PUCCH, and instead, UCI may always be piggybacked via PUSCH.

If there is no PUSCH scheduled in a subframe where UCI should be transmitted via PUSCH piggyback, the following alternatives may be considered.

(1) UCI which is to be transmitted via PUSCH may be transmitted. That is, HARQ-ACK transmission may be delayed to the next PUSCH transmission and/or CSI transmission may be dropped. If HARQ-ACK transmission is delayed, it may incur the change of HARQ-ACK timing. For the next available PUSCH, all unsent HARQ-ACK may be piggybacked via the next available PUSCH due to the lack of PUSCH grant. For example, at subframe n, when a UE is configured with 10 CCs, HARQ-ACK for 8 CCs may be transmitted via PUCCH and the remaining HARQ-ACK for 2 CCs may be left for PUSCH piggyback. Since subframe n does not have any scheduled PUSCH, HARQ-ACK for 2 CCs may be delayed. If at subframe n+1, if a UE is configured with PUSCH, HARQ-ACK for 2 CCs at subframe n may be piggybacked via PUSCH at subframe n+1.

(2) A UE may be configured with a default PUSCH configuration by higher layer which will be used to piggyback UCI (higher layer configuration may be similar to semi-persistent scheduling (SPS) configuration)

If there are too much content to be piggybacked within a PUSCH, UCI may be split between multiple PUSCHs. For splitting UCI between multiple PUSCHS, K PUSCHs may be selected based on SCellIndex where PUSCH is transmitted. Or, UCI may be split based on SCellIndex (by grouping a few carriers). Or, UCI may be split based on the size of UCI (e.g. by grouping 20 bits for HARQ-ACK and 80 bits for CSI).

When a UE is not granted more than one PUSCH (or not at all), the first K SCells (based on SCellIndex) may use the reference PUSCH to transmit UCI. If there are PUSCH scheduled already, those PUSCHs may be allocated first, and if more PUSCHs are still needed, the reference PUSCH may be allocated based on SCellIndex where PUSCH has not been granted on that SCell to make K PUSCHs for UCI piggyback.

FIG. 6 shows an example of a method for splitting UCI according to an embodiment of the present invention. In step S100, the UE splits UCI for a plurality of cells into a PUCCH and PUSCH. In step S110, the UE transmits the split UCI via the PUCCH and the PUSCH. The UCI may include a HARQ-ACK feedback and CSI feedback. The HARQ-ACK feedback may be allocated to the PUCCH up to a maximum allowed bits first, and if there is a remaining HARQ-ACK feedback after allocating the HARQ-ACK feedback to the PUCCH, the remaining HARQ-ACK feedback may be allocated to the PUSCH. The HARQ-ACK feedback may be prioritized over the CSI feedback. The CSI feedback may be allocated to the PUSCH.

Alternatively, a number of cells, whose UCI is allocated to the PUCCH, may be limited to a specific number. The specific number may be 5. Different number of cells used by the PUCCH may be limited, and CSI may be allocated to the PUSCH. HARQ-ACK for a first set of cells, among the plurality of cells, may be allocated to the PUCCH, and HARQ-ACK for a second set of cells, among the plurality of cells, may be allocated to the PUSCH.

The UCI may be transmitted via the PUSCH at a subframe where the PUSCH is scheduled. If there is no PUSCH scheduled at a subframe where the UCI should be transmitted via the PUSCH, the transmission of the UCI via the PUSCH may be delayed.

The UE may further split the UCI for the plurality of cells into multiple PUSCHs. A number of PUSCHs, among the multiple PUSCHs, where the UCI is transmitted via the PUSCH may be selected based on an index of a SCell. Or, The UCI may be split into the multiple PUSCHs based on an index of a SCell or a size of the UCI.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for a user equipment (UE) in a wireless communication system, the method comprising:
    splitting a hybrid automatic repeat request acknowledgement (HARQ-ACK) feedback for a plurality of cells into a physical uplink control channel (PUCCH) and multiple physical uplink shared channels (PUSCHs), wherein the multiple PUSCHs include a first PUSCH and a second PUSCH, and
    wherein the splitting the HARQ-ACK feedback includes:
        allocating a first portion of the HARQ-ACK feedback to the PUCCH up to a maximum allowed bits,
        when there is a second portion of the HARQ-ACK feedback, which remains after allocating the first portion of the HARQ-ACK feedback to the PUCCH, allocating the second portion of the HARQ-ACK feedback to the first PUSCH, and
        when there is a third portion of the HARQ-ACK feedback, which remains after allocating the second portion of the HARQ-ACK feedback to the first PUSCH, allocating the third portion of the HARQ-ACK feedback to the second PUSCH; and
    transmitting the first portion, the second portion and the third portion of the HARQ-ACK feedback via the PUCCH, the first PUSCH and the second PUSCH, respectively,
    wherein the first PUSCH and the second PUSCH are selected among the multiple PUSCHs, based on index of serving cells to which the first PUSCH and the second PUSCH are allocated.

2. The method of claim 1, wherein a number of cells, whose HARQ-ACK feedback is allocated to the PUCCH, is limited to a specific number.

3. The method of claim 2, wherein the specific number is 5.

4. The method of claim 1, wherein different number of cells used by the PUCCH is limited, and
    wherein channel state information (CSI) is allocated to the PUSCH.

5. The method of claim 1, wherein HARQ-ACK for a first set of cells, among the plurality of cells, is allocated to the PUCCH, and
    wherein HARQ-ACK for a second set of cells, among the plurality of cells, is allocated to the PUSCH.

6. The method of claim 1, wherein the HARQ-ACK feedback is transmitted via the PUSCH at a subframe where the PUSCH is scheduled.

7. The method of claim 1, wherein if there is no PUSCH scheduled at a subframe where the HARQ-ACK feedback should be transmitted via the PUSCH, the transmission of the HARQ-ACK feedback via the PUSCH is delayed.

8. The method of claim 1, wherein the HARQ-ACK feedback is split into the multiple PUSCHs based on an index of a SCell or a size of the UCI.

9. A user equipment (UE) in a wireless communication system, the UE comprising:
    a memory;
    a transceiver; and
    a processor coupled to the memory and the transceiver, and configured to:
        split a hybrid automatic repeat request acknowledgement (HARQ-ACK) feedback for a plurality of cells into a physical uplink control channel (PUCCH) and multiple physical uplink shared channels (PUSCHs), wherein the multiple PUSCHs include a first PUSCH and a second PUSCH, and
        wherein the processor is configured to split the HARQ-ACK feedback by:
            allocating a first portion of the HARQ-ACK feedback to the PUCCH up to a maximum allowed bits,
            when there is a second portion of the HARQ-ACK feedback, which remains after allocating the first portion of the HARQ-ACK feedback to the PUCCH, allocating the second portion of the HARQ-ACK feedback to the first PUSCH, and
            when there is a third portion of the HARQ-ACK feedback, which remains after allocating the second portion of the HARQ-ACK feedback to the first PUSCH, allocating the third portion of the HARQ-ACK feedback to the second PUSCH, and
control the transceiver to transmit the first portion, the second portion and the third portion of the HARQ-ACK feedback via the PUCCH, the first PUSCH and the second PUSCH, respectively,
wherein the first PUSCH and the second PUSCH are selected among the multiple PUSCHs, based on index of serving cells to which the first PUSCH and the second PUSCH are allocated.

* * * * *